(12) United States Patent
Powers

(10) Patent No.: US 9,631,579 B1
(45) Date of Patent: Apr. 25, 2017

(54) SEAL ASSEMBLIES AND METHODS FOR REMOVABLE PRECOMBUSTION CHAMBER TIP

(71) Applicant: Charles S. Powers, Shreveport, LA (US)

(72) Inventor: Charles S. Powers, Shreveport, LA (US)

( * ) Notice: Subject to any disclaimer, the term of this patent is extended or adjusted under 35 U.S.C. 154(b) by 135 days.

(21) Appl. No.: 14/829,883

(22) Filed: Aug. 19, 2015

Related U.S. Application Data

(60) Provisional application No. 62/040,122, filed on Aug. 21, 2014.

(51) Int. Cl.
F02B 19/16 (2006.01)
F02M 21/02 (2006.01)

(52) U.S. Cl.
CPC ......... F02M 21/0218 (2013.01); F02B 19/16 (2013.01)

(58) Field of Classification Search
CPC .................................................. F02M 21/0218
USPC ........................................................ 123/254
See application file for complete search history.

(56) References Cited

U.S. PATENT DOCUMENTS

| 4,492,114 | A | * | 1/1985 | Yamanaka | ............ | F02B 77/085 73/114.26 |
| 5,072,709 | A | * | 12/1991 | Long | .................... | F02M 57/024 123/446 |
| 5,662,082 | A | | 9/1997 | Black et al. | | |
| 5,778,849 | A | | 7/1998 | Regueiro | | |
| 5,915,351 | A | * | 6/1999 | Regueiro | ................ | F02B 19/16 123/254 |
| 6,019,081 | A | | 2/2000 | Divecha et al. | | |
| 6,512,204 | B1 | * | 1/2003 | Chiu | .................. | F02B 23/0657 123/145 A |
| 2013/0139784 | A1 | | 6/2013 | Pierz | | |

* cited by examiner

Primary Examiner — Marguerite McMahon
(74) Attorney, Agent, or Firm — R. Keith Harrison

(57) ABSTRACT

Seal assemblies for a pre-chamber assembly include a pre-chamber body having an outer chamber surface; a pre-chamber tip; a seal covering area carried by the pre-chamber tip; at least one hard seal between the seal covering area of the pre-chamber tip and the pre-chamber body; at least one elastomeric seal between the seal covering area of the pre-chamber tip and the pre-chamber body; a fuel inlet passage in the pre-chamber body; a fuel discharge passage disposed in fluid communication with the fuel inlet passage; and a drill passage in the pre-chamber body adjacent to the seal covering area and aligned with the fuel discharge passage, the drill passage and the fuel discharge passage disposed at an angle other than 90 degrees with respect to the outer chamber surface of the pre-chamber body.

22 Claims, 8 Drawing Sheets

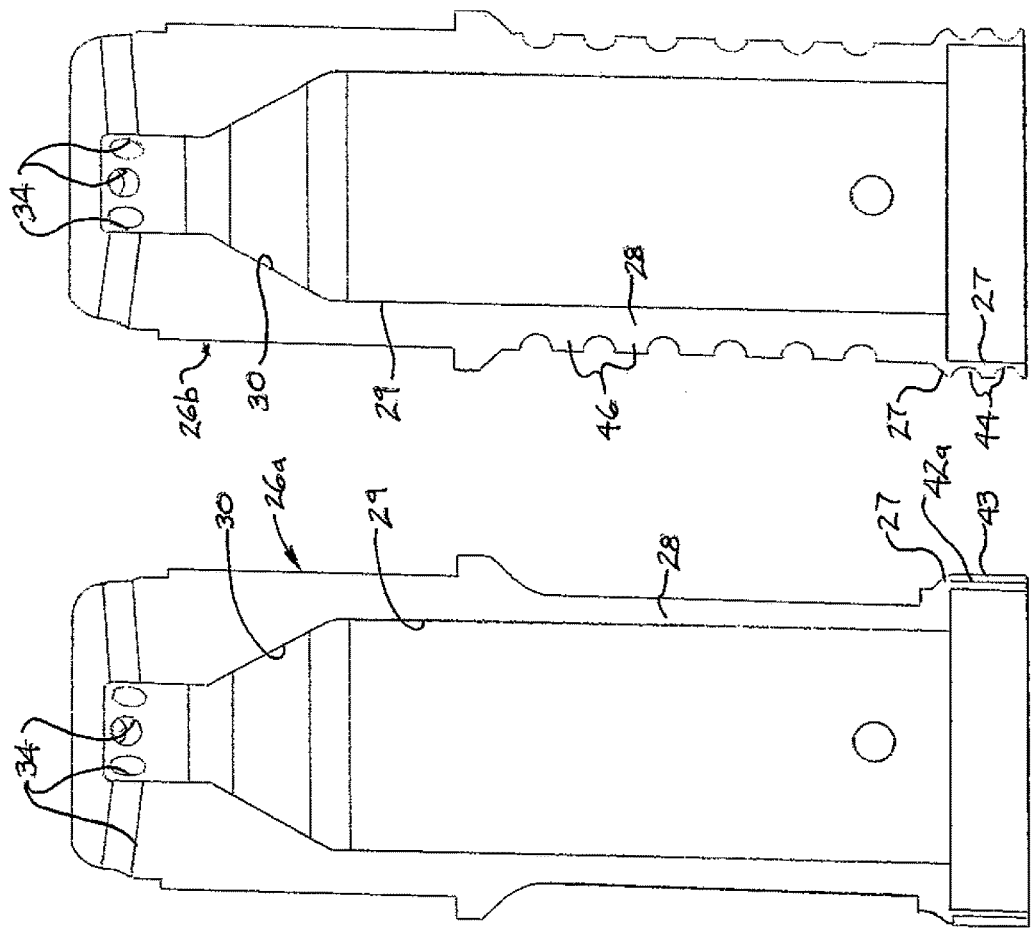
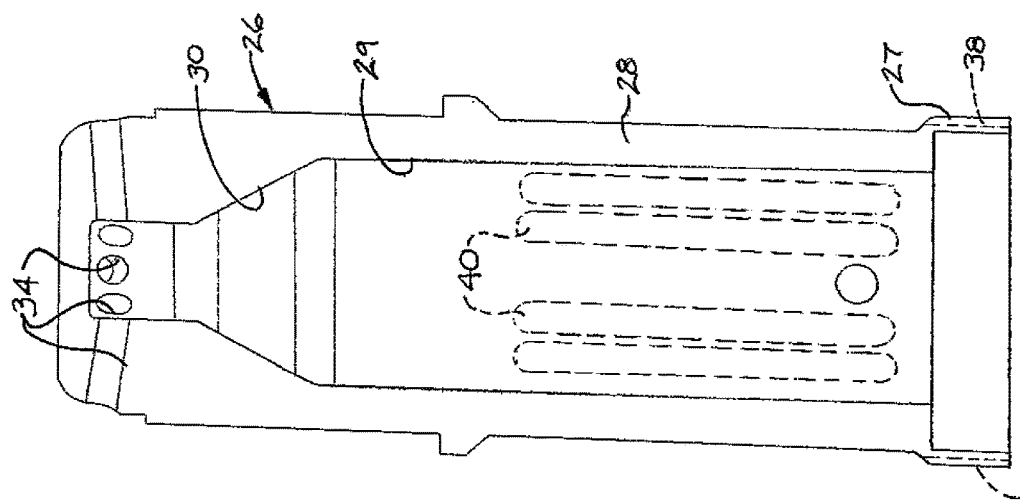

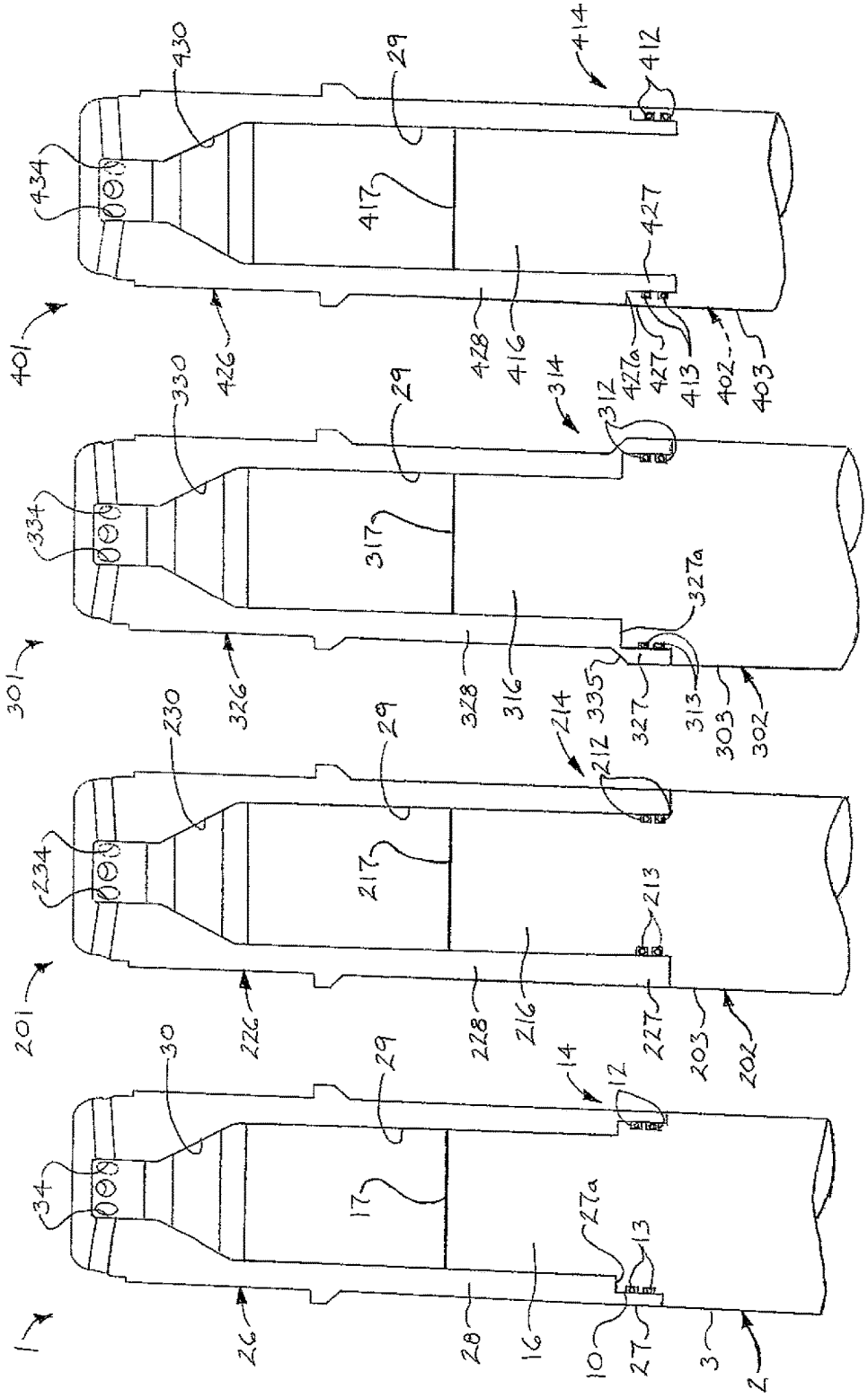

US 9,631,579 B1

SEAL ASSEMBLIES AND METHODS FOR REMOVABLE PRECOMBUSTION CHAMBER TIP

CROSS-REFERENCE TO RELATED APPLICATIONS

This application claims the benefit of U.S. provisional application No. 62/040,122, filed Aug. 21, 2014 and entitled "SEAL ASSEMBLIES AND METHODS FOR REMOVABLE PRECOMBUSTION CHAMBER TIP", which provisional application is incorporated by reference herein in its entirety.

FIELD

Illustrative embodiments of the disclosure generally relate to natural gas engines. More particularly, illustrative embodiments of the disclosure relate to seal assemblies and methods which are suitable for imparting a seal between a removable pre-chamber tip and a pre-chamber body in a pre-chamber assembly of a natural gas engine and are characterized by enhanced sealing characteristics.

BACKGROUND

The background description provided herein is solely for the purpose of generally presenting the context of the illustrative embodiments of the disclosure. Aspects of the background description are neither expressly nor impliedly admitted as prior art against the claimed subject matter.

Conventional natural gas engines may include multiple combustion cylinders each having a pre-chamber assembly in which combustion of natural gas occurs. Each pre-chamber assembly may include a pre-chamber body which receives a stream of fuel and meters the fuel to a pre-chamber tip. An igniter may ignite the fuel as it is metered into the pre-chamber tip. A cooling jacket which contains a supply of liquid coolant may surround the pre-chamber assembly to dissipate combustion heat. Due the generation of heat during operation of the engine, seals which normally maintain a fluid-tight connection between the pre-chamber body and the pre-chamber tip may be compromised over time, resulting in leakage of liquid coolant into the stream of fuel and consequently, combustion of the coolant with the fuel in the pre-chamber tip. This may necessitate frequent replacement of the pre-chamber assembly parts.

Accordingly, seal assemblies and methods which are suitable for imparting a seal between a removable pre-chamber tip and a pre-chamber body in natural gas engines and are characterized by enhanced sealing characteristics are needed.

SUMMARY

Illustrative embodiments of the disclosure are generally directed to seal assemblies and methods for a removable combustion chamber tip in a pre-chamber assembly. An illustrative embodiment of the seal assemblies includes a pre-chamber body having an outer chamber surface; a pre-chamber tip; a seal covering area carried by the pre-chamber tip; at least one hard seal between the seal covering area of the pre-chamber tip and the pre-chamber body; at least one elastomeric seal between the seal covering area of the pre-chamber tip and the pre-chamber body; a fuel inlet passage in the pre-chamber body; a fuel discharge passage disposed in fluid communication with the fuel inlet passage; and a drill passage in the pre-chamber body adjacent to the seal covering area and aligned with the fuel discharge passage, the drill passage and the fuel discharge passage disposed at an angle other than 90 degrees with respect to the outer chamber surface of the pre-chamber body.

BRIEF DESCRIPTION OF THE DRAWINGS

Illustrative embodiments of the disclosure will now be described, by way of example, with reference to the accompanying drawings, in which:

FIG. 4 is a longitudinal sectional view of a pre-chamber tip according to an illustrative embodiment of the seal assemblies, with multiple longitudinal cooling fins in the pre-chamber tip;

FIG. 5 is a longitudinal sectional view of a pre-chamber tip of an alternative illustrative embodiment of the seal assemblies, with a seal covering sleeve in the seal covering area of the pre-chamber tip;

FIG. 6 is a longitudinal sectional view of a pre-chamber tip of another illustrative embodiment of the seal assemblies with multiple circumferential cooling fins in the pre-chamber tip;

FIGS. 10-13 are cross-sectional views, respectively, of seal assemblies having various configurations;

DETAILED DESCRIPTION

Figure 1:
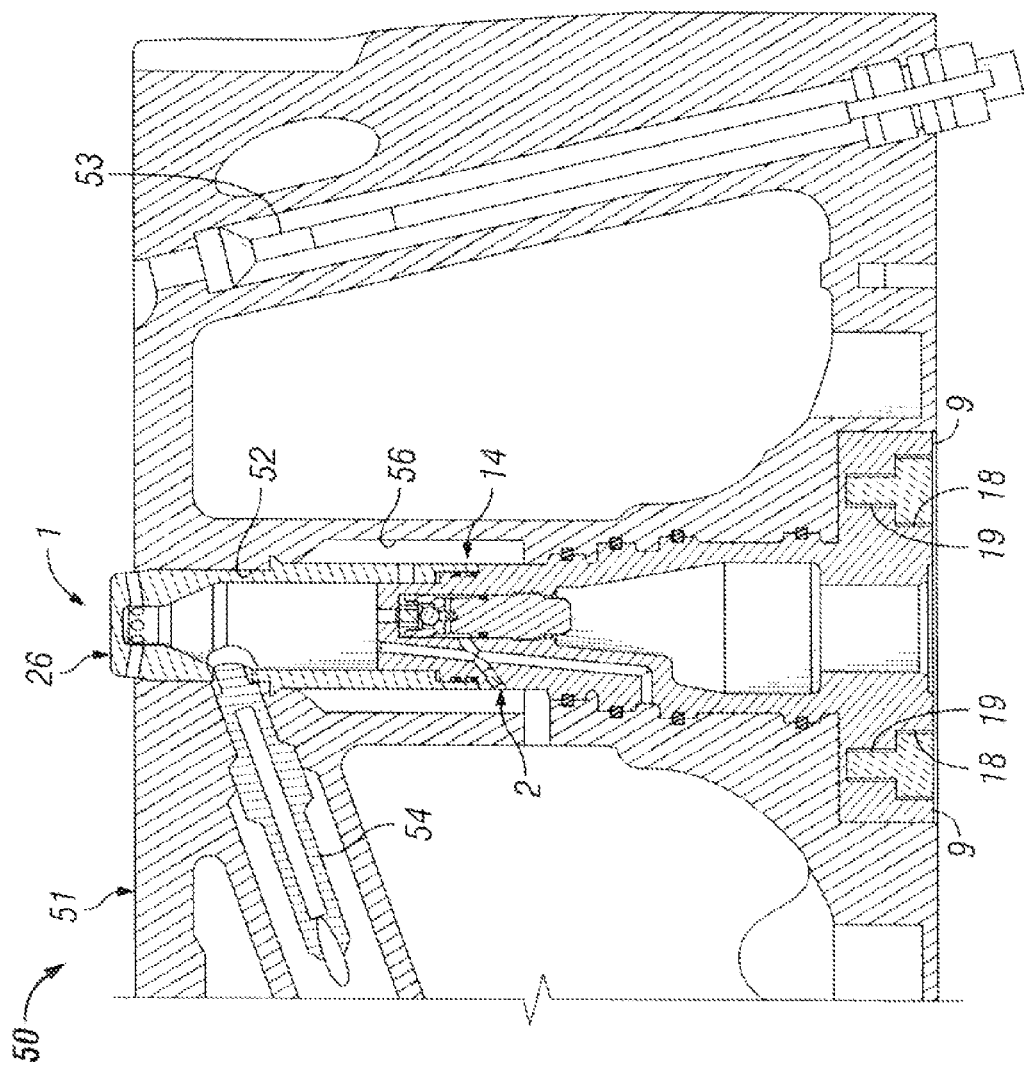
FIG. 1 is a sectional view of a portion of a combustion cylinder head in a natural gas engine with a typical pre-chamber assembly in the combustion cylinder head.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Illustrative embodiments of the disclosure are generally directed to seal assemblies and methods for sealing a removable or field-replaceable pre-chamber tip to a pre-chamber body of a pre-chamber assembly which may be used in a natural gas engine. The seal assemblies may prevent inflow of coolant into the two or more piece pre-chamber assembly for pre-ignition of a combustible fuel in the internal combustion engine. The seal assemblies may include one or more elastomeric seals which may be placed on the engine side (forward or distal side) of hard sealing surfaces between the pre-chamber body and the pre-chamber tip and/or alternatively, on the rearward side (away from the combustion chamber or proximal side) of the hard sealing surfaces. The hard sealing surfaces may include a hard curing sealing compound, an intermediate metal seal material sandwiched there between, a sandwiched metal seal including deformable components and/or other hard surface sealing methods or techniques known to those skilled in the art. The hard sealing surfaces of the sealing assemblies may function primarily as a seal against high temperatures from combustion. The elastomeric seal or seals of the seal assemblies may impart resistance to intrusion of coolant between the pre-chamber body and the pre-chamber tip.

The elastomeric seal or seals of the seal assemblies may include at least one elastomeric ring seated in an internal or external seal groove, at least one elastic or inelastic external seal which may include a sealing band or collar enshrouding a joint line, at least one elastomeric material applied in a curing solution and/or other similar elastic joint sealing methods or techniques known to those skilled in the art.

In some embodiments, the pre-chamber body and pre-chamber tip may be fabricated of dissimilar materials.

In some embodiments, the sealing assemblies may utilize two or more different sealing methodologies in which at least one is elastomeric.

In some embodiments, at least one elastomeric seal may be located rearwardly or distally of a point of fuel entry into the pre-chamber body.

In some embodiments, the sealing assemblies may be disposed within a pressurized coolant distribution passage in the pre-chamber body, either in direct contact with coolant or in a backup capacity.

In some embodiments, the seal assembly may include an external seal which may include an exterior collar seal with forward (distal) and rearward (proximal) elastomeric seals protecting the hard sealing surfaces. The seal assembly may also include an integral seal flange which is directly mated to the collar seal. The use of the collar seal may require special surfacing and grooving to remove weldments on the surface, as in the pre-chambers of the type used in CATER-PILLAR 3300 and 3600 natural gas engines, as a non-limiting example. These engines may include both a welded bayonet lock pin and a weld location for capping a drilled access port to allow for gas movement to a fuel metering valve in the pre-chamber body.

In some embodiments, the seal grooves or elastomeric fitment area for the elastomeric seal or seals may be machined into the heat-affected area of a weldment.

In some embodiments, the fuel discharge passage for entry of fuel into the fuel metering valve in the pre-chamber body may be drilled at an angle of other than 90 degrees normal to the centerline of the pre-chamber body.

In some embodiments, the pre-chamber tip may have an outer diameter which is smaller than the outer diameter of the seal covering area.

In some embodiments, the pre-chamber tip may have an outer diameter which is substantially the same as or continuous with the outer diameter of the seal covering area, which may overlap onto the pre-chamber body, providing a smoother and unrestricted surface for coolant flow, thereby enhancing cooling of the pre-chamber body and the pre-chamber tip as compared to a flange with a dissimilar diameter, which impedes coolant flow.

In some embodiments, the pre-chamber tip may have an outer diameter which is larger than the outer diameter of the seal covering area.

In some embodiments, the pre-chamber tip may have one or more longitudinal or circumferential cooling fins, grooves or slots which increase the surface area exposed to coolant and maintain a lower temperature within the seal covering area.

In some embodiments, the ratio of the outer diameter of the seal covering area to the inner diameter of the seal covering area may be from about 1.03 to about 1.38. At ratios of less than about 1.03, strength may be inadequate to withstand high pressures; at ratios of greater than about 1.38, the wall thickness of the seal covering area may become a thermal barrier for the coolant to quench the elastomeric seals, depending on the extent of the optional use of cooling fins and the addition of thermal transfer materials such as copper.

In some embodiments, the hard sealing surfaces may be separated by a clearance of about 0.020" or less, thereby allowing the elastomeric seal or seals to withstand pressures of at least about 100 psi.

In some embodiments, the interior diameter of the pre-chamber tip may be larger than the exterior diameter of the encasement of the fuel metering valve in the pre-chamber body.

Figure 2:
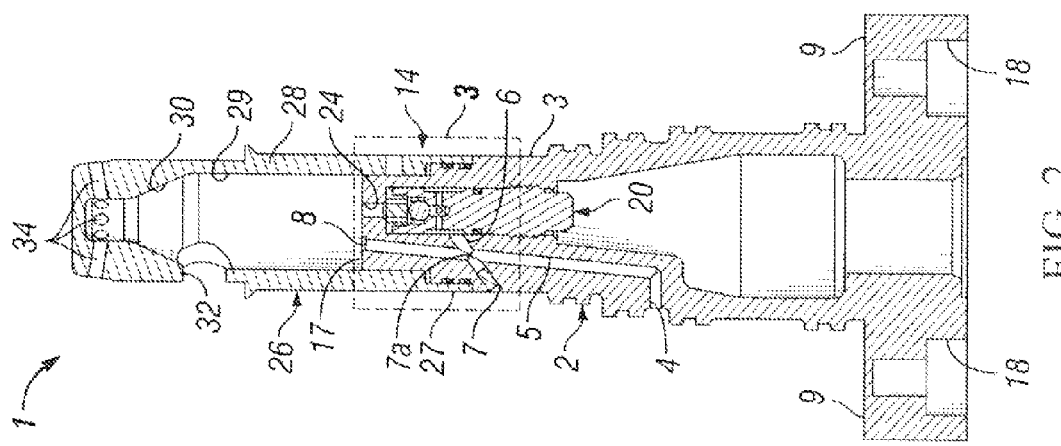
FIG. 2 is a longitudinal sectional view of a typical pre-chamber assembly with an illustrative embodiment of the seal assemblies in the pre-chamber assembly.

Referring initially to FIGS. 1-6 and 14-16 of the drawings, a typical pre-chamber assembly 1 having an illustrative embodiment of a seal assembly 14 is illustrated. As illustrated in FIG. 1, in typical application, the pre-chamber assembly 1 may be installed in an assembly cavity 52 in a combustion cylinder head 51 of a natural gas engine 50. As illustrated in FIG. 2, the pre-chamber assembly 1 may include a pre-chamber body 2 having an outer chamber surface 3. The pre-chamber body 2 may be fitted with chamber mount flanges 9 which facilitate attachment of the pre-chamber body 2 to the combustion cylinder head 51 (FIG. 1) typically by extending a pair of assembly mount bolts 19 (FIG. 1)) through respective bolt openings 18 in the chamber mount flanges 9 and threading the assembly mount bolts 19 in threaded openings (not illustrated) in the combustion cylinder head 51, in the conventional manner. An annular flange shoulder 10 (FIG. 3) may be provided in the outer chamber surface 3 of the pre-chamber body 2. A tapered chamber nipple 16 may extend beyond the flange shoulder 10. The chamber nipple 16 may have a terminal nipple surface 17.

A pre-chamber tip 26 extends from the pre-chamber body 2. The pre-chamber tip 26 may include a chamber tip main wall 28. An exterior seal covering area 27 and an interior shoulder cavity 27a may terminate a proximal end (closest to the chamber mount flanges 9) of the chamber tip main wall 28. The seal covering area 27 engages the flange shoulder 10 in the outer chamber surface 3 of the pre-chamber body 2. At least one seal groove 12 may be provided in the exterior surface of the flange shoulder 10 and/or in the interior surface of the seal covering area 27. An elastomeric seal 13 may be seated in each seal groove 12. In some embodiments, a hard seal 80, which may include copper or composite material, for example and without limitation, may be sandwiched between the flange shoulder 10 of the pre-chamber body 2 and the shoulder cavity 27a on the pre-chamber tip 26. Accordingly, the elastomeric seal or seals 13 and the hard seal 80 may impart a fluid-tight seal between the pre-chamber tip 26 and the pre-chamber body 2 at the seal covering area 27 for purposes which will be hereinafter described. The elastomeric seal or seals 13 of the seal assemblies 14 may impart resistance to intrusion of coolant from the cooling jacket 56 (FIG. 1) between the pre-chamber body 2 and the pre-chamber tip 26. As the assembly mount bolts 19 (FIG. 1) are tightened in the respective bolt openings 18, the hard seal 80 is compressed between the pre-chamber body 3 and the pre-chamber tip 26.

The chamber tip main wall 28 of the pre-chamber tip 26 encloses a chamber tip interior 29 which may have a pre-chamber tip interior taper 30 (FIG. 2) at the distal end of the pre-chamber tip 26. A spark plug opening 32 may extend through the chamber tip main wall 28 at the pre-chamber tip interior taper 30. Multiple nozzle openings 34 may extend through the chamber tip main wall 28 at the distal end of the pre-chamber tip 26. The terminal nipple surface 17 of the chamber nipple 16 on the pre-chamber body 2 faces the chamber tip interior 29 of the pre-chamber tip 26.

Figure 3:
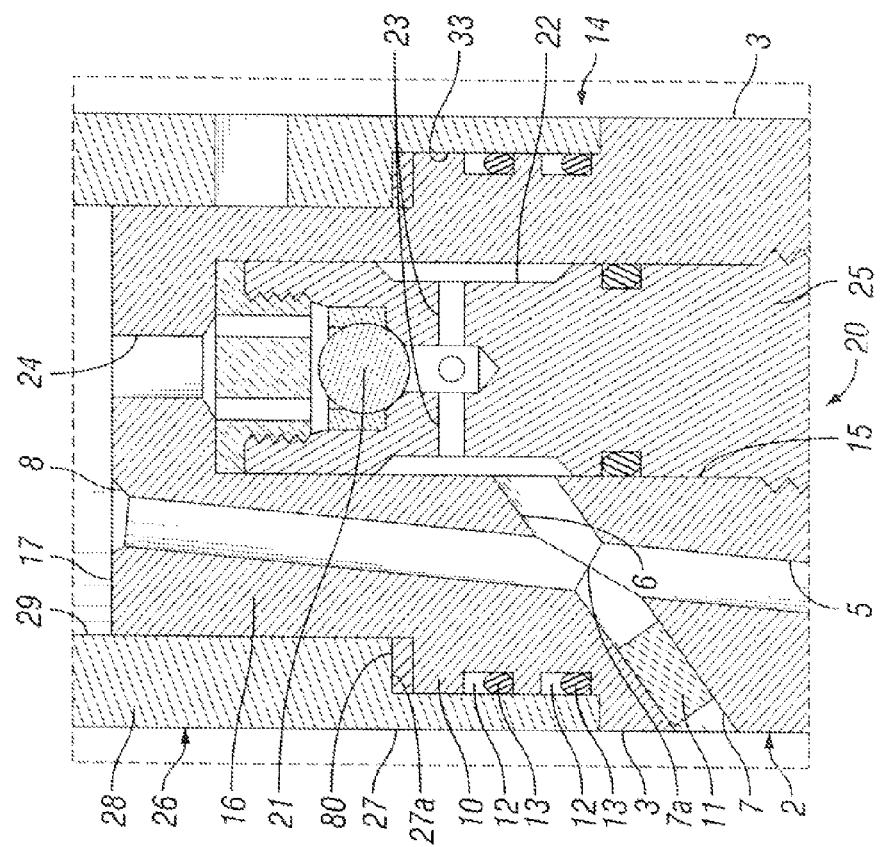
FIG. 3 is an enlarged sectional view, taken along section line 3 in FIG. 2, of the illustrative seal assembly.

A fuel metering valve 20 may be provided in the pre-chamber body 2. As illustrated in FIG. 3, the fuel metering valve 20 may include a valve housing 25 which is situated in a valve cavity 15 in the pre-chamber body 2. A fuel inlet annulus 22 may be provided in the outer surface of the valve housing 25 at the interface between the valve housing 25 and the valve cavity 15. Fuel inlet passages 23 in the valve housing 25 may be disposed in fluid communication with the fuel inlet annulus 22. A check valve 21 may be disposed in fluid communication with the fuel inlet passages 23. A fuel outlet passage 24 may be disposed in fluid communication with the check valve 21. The fuel outlet passage 24 may open into the chamber tip interior 29 of the pre-chamber tip 26 at the terminal nipple surface 17 of the chamber nipple 16.

A fuel inlet passage 4 (FIG. 2) may extend into the outer chamber surface 3 of the pre-chamber body 2. In installation of the pre-chamber assembly 1 in the assembly cavity 52 (FIG. 1) of the combustion cylinder head 51, the fuel inlet passage 4 is disposed in fluid communication with a fuel conduit (not illustrated) which extends from a fuel source such as a source of natural gas (not illustrated), typically in the conventional manner. A fuel distribution passage 5 is disposed in fluid communication with the fuel inlet passage 4 and extends generally longitudinally through the pre-chamber body 2. The fuel distribution passage 5 may terminate at a fuel discharge opening 8 at the terminal nipple surface 17 of the chamber nipple 16.

A fuel discharge passage 6 may establish fluid communication between the fuel distribution passage 5 and the fuel inlet annulus 22 in the valve housing 25 of the fuel metering valve 20. The internal fuel passage 6 may be disposed generally between the seal covering area 27 of the pre-chamber tip 26 and the fuel inlet annulus 22. Accordingly, the fuel discharge passage 6 may be formed by initially drilling a drill passage 7 at an angle from the outer chamber surface 3 of the pre-chamber body 2 just adjacent to the flange shoulder 10 and continuing to drill the fuel discharge passage 6 across the fuel distribution passage 5 to the fuel inlet annulus 22. Thus, the fuel discharge passage 6 and the drill passage 7 intersect the fuel distribution passage 5 at a fuel passage intersection 7a. Therefore, the drill passage 7 and the fuel discharge passage 6 may be oriented or offset at an angle other than 90 degrees with respect to the outer chamber surface 3 or the longitudinal axis of the pre-chamber body 2 to evade the flange shoulder 10. As illustrated in FIG. 3, a drill passage plug 11 may be inserted and welded or otherwise secured in place in the drill passage 7 for sealing purposes.

As further illustrated in FIG. 3, the seal assembly 14 may include at least one sealing surface 33 between the seal covering area 27 of the pre-chamber tip 26 and the flange shoulder 10 of the pre-chamber body 2. As used herein, "sealing surface" means a sealing abutment between two non-elastomeric sealing surfaces. For example and without limitation, in some embodiments, the sealing surface 33 may include metal-to-metal sealing surfaces such as copper sealing surfaces, in non-exclusive particular. In some embodiments, at least one sealing surface 33 may be located between the elastomeric seal or seals 13 and the chamber tip main wall 28 of the pre-chamber tip 26. In some embodiments, at least one sealing surface 33 may be located between the elastomeric seal or seals 13 and the chamber mount flange 9 end of the pre-chamber body 2. Each sealing surface 33 may impart a seal against high temperatures from combustion between the pre-chamber body 2 and the pre-chamber tip 26. In some embodiments, the sealing surfaces 33 may extend into the zone occupied by the hard seal 80, whereby copper press fit, interference fit, welded, cladded or otherwise bonded to the pre-chamber tip results in an integral sealing unit, thereby replacing the hard seal 80.

The pre-chamber tip 26 may include a specialized alloy which is capable of withstanding long-term exposure to combustion temperatures. For example and without limitation, in some embodiments, the pre-chamber tip 26 may include a high nickel and chrome content steel alloy. The seal covering area 27 may include the same material, or alternatively, may include a material having a higher rate of thermal diffusivity. It will be well understood by those skilled in the art that a material of high thermal diffusivity is typically not capable of withstanding continuous exposure to high combustion temperatures. Accordingly, the seal covering area 27 may be given additional ability to diffuse heat (thereby protecting the elastomeric seal or seals 13) by rendering the seal covering area 27 as a separate coupling which includes the highly diffusive material, or alternatively, by sandwiching/welding/brazing and/or otherwise attaching the material of high diffusivity onto the base material. Still further in the alternative, conformal grooves (not illustrated) may be provided in the seal covering area 27 to increase the surface area of the seal covering area 27 which is exposed to coolant, thereby increasing the rate of thermal dispersion. It will be noted that as the alloying elements of chrome and nickel are added to carbon steel, the rate of thermal diffusivity falls from a range of about 11.72 (mm squared/s) to about 3.428. Thus, the same qualities that produce oxidation resistance for the pre-chamber tip 26 may also reduce the ability of the pre-chamber tip 26 to shed heat that would otherwise be damaging to the elastomeric seal or seals 13. By comparison, the rating for copper is about 111, thereby explaining the widespread use of this alloy for thermal diffusion. Therefore, copper is a non-limiting example of a material which may be cladded, bonded or otherwise attached to the pre-chamber tip 26 to enhance thermal diffusion.

Figure 15:
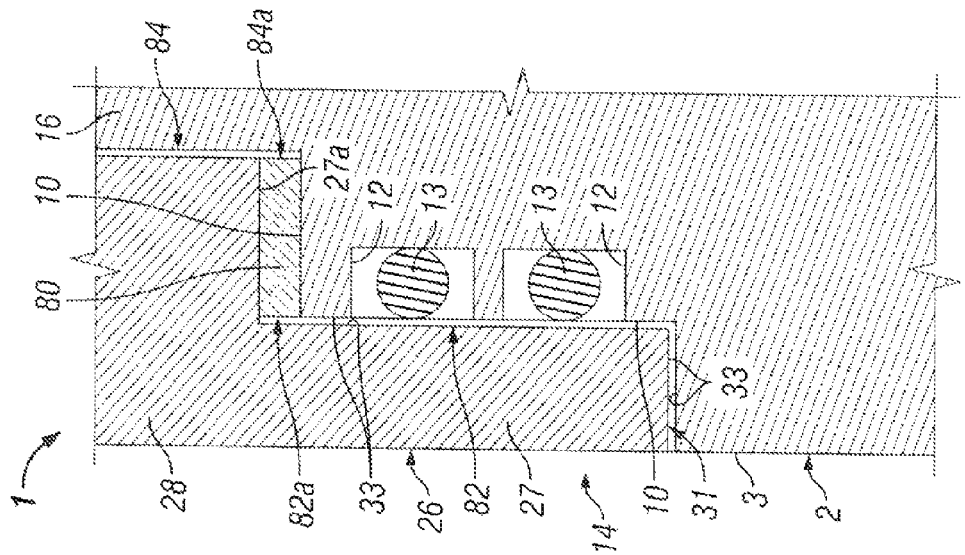
FIG. 15 is an enlarged sectional view of an illustrative embodiment of the seal assemblies, more particularly illustrating a typical tensioning gap and clearance gaps between the pre-chamber body and the seal covering area on the pre-chamber tip of the seal assembly prior to tightening of assembly mount bolts (not illustrated) which secure the pre-chamber tip on the pre-chamber body.
Figure 14:
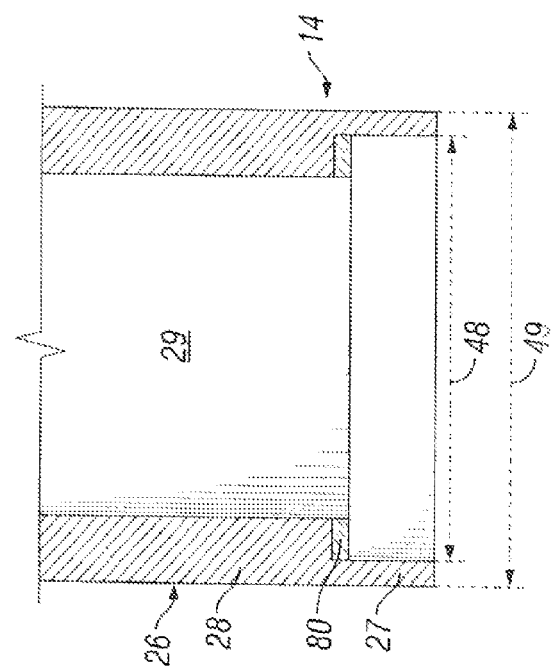
FIG. 14 is an enlarged sectional view of a typical seal covering area of an illustrative embodiment of the seal assemblies, more particularly illustrating a typical ratio of inner diameter to outer diameter of the seal covering area.

As illustrated in FIG. 14, the seal covering area 27 on the pre-chamber tip 26 may have an inner diameter 48 and an outer diameter 49. In some embodiments, the ratio of the outer diameter 49 to the inner diameter 48 of the seal covering area 27 may be from about 1.03 to about 1.38. At ratios of less than about 1.03, the wall thicknesses of the pre-chamber body 2 and the pre-chamber tip 26 may be insufficient to accommodate the fluid pressures which occur during operation of the pre-chamber assembly 1. At ratios of greater than about 1.38, the wall thicknesses of the pre-chamber body 2 and the pre-chamber tip 26 may be excessively thick for optimum fluid flow. As illustrated in FIG. 15, in some embodiments, an outer clearance gap 82 may extend between the pre-chamber body 2 and the pre-chamber tip 26 between the sealing surface 33 at the seal covering area 27. An inner clearance gap 84 may extend between the outer diameter of the chamber nipple 16 on the pre-chamber body 2 and the inner diameter of the chamber tip main wall 28 of the pre-chamber tip 26. Before tightening of the assembly mount bolts 19 in the bolt openings 18, the outer clearance gap 82 may have an outer hard seal portion 82a which extends between the inner diameter of the seal covering area 27 and the outer diameter of the hard seal 80. Likewise, the inner clearance gap 84 may have an inner hard seal portion 84a which extends between the outer diameter of the chamber nipple 16 on the pre-chamber body 2 and the inner diameter of the hard seal 80. The outer clearance gap 82 and the inner clearance gap 84 may each have a width of about 0.020" or less, thereby allowing the elastomeric seal or seals 13 to withstand pressures of at least about 100 psi, but more preferentially will have a clearance gap of 0.005" or less, particularly in the outer hard seal portion 82a and the inner hard seal portion 84a in direct proximity with the hard seal 80. It will be noted that the clearance gaps 82 and 84 may be non-uniform longitudinally, so as a non-limiting example, to provide a tight seal immediately adjacent the hard seal 80, but of a different diameter to produce different sealing characteristics in the elastomeric seal area 13. Accordingly, by maintaining a tight 0.005" or less tolerance in the outer hard seal portion 82a and inner hard seal portion 84a, the magnitude of plastic deformation of the hard seal 80 upon tightening of the assembly mount bolts 19 may be limited by the volumetric constraints of the surrounding sealing surfaces 33.

Figure 16:
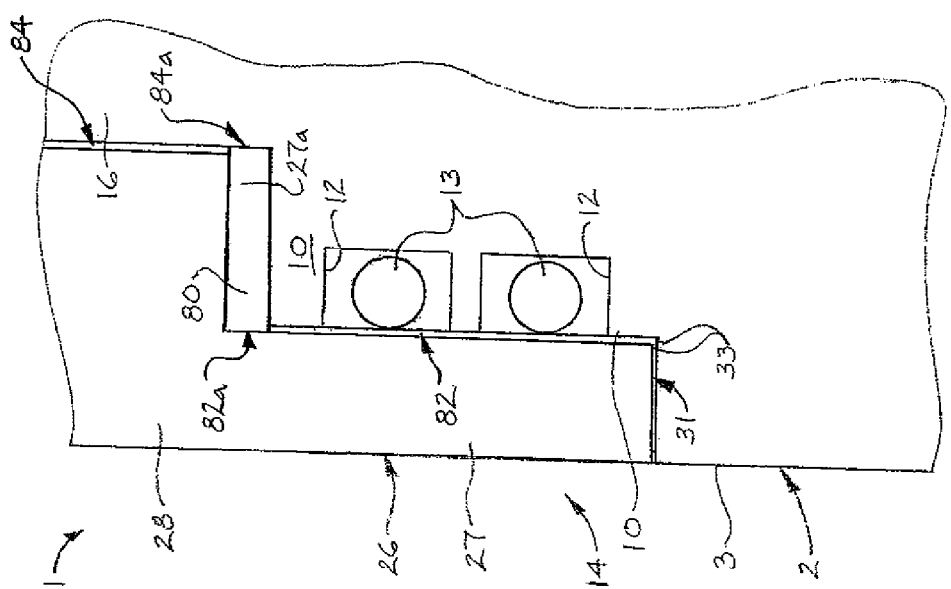
FIG. 16 is an enlarged sectional view of an illustrative embodiment of the seal assemblies, more particularly illustrating partial closure of the tensioning gap and clearance gaps and closure of the clearance gap portions between a hard seal and the pre-chamber body and the seal covering area on the pre-chamber tip of the seal assembly after tightening of the assembly mount bolts which secure the pre-chamber tip on the pre-chamber body.

As illustrated in FIG. 16, after the assembly mount bolts 19 have been tightened and the components of the seal assembly 14 tensioned to the point at which plastic deformation of the hard seal 80 has completely filled the outer hard seal portion 82a of the outer clearance gap 82 and the inner hard seal portion 84a of the inner clearance gap 84, no further deformation of the hard seal 80 is possible at the torque loads which are normally applied to the pre-chamber body 2 and the pre-chamber tip 28 in operation of the engine. Accordingly, a tighter seal (which cannot be further degraded due to temperature cycling of the seal components during combustion or the hammering action of the combustion explosions) is formed.

As further illustrated in FIGS. 15 and 16, in some embodiments, a tensioning gap 31 may be disposed between the seal covering area 27 of the pre-chamber tip 26 and the pre-chamber body 2, extending from the outer chamber surface 3 to the outer clearance gap 82. The tensioning gap 31 remains intact throughout tightening of the assembly mount bolts 19 in the bolt openings 18 (FIG. 1), and may be of sufficient length to facilitate slidable tensioning action to fully deform and encapsulate the sealing surface 33 as it abuts the hard seal 80. In some embodiments, the tensioning gap 31 may have a length of travel of at least about 0.015" and in any case must have sufficient length of travel which is sufficient to allow the compression of hard seal 80 forcing it to plastically deform and thereby eliminate the outer hard seal portion 82a of the outer clearance gap 82 and the inner hard seal portion 84a of the inner clearance gap 84 surrounding the hard seal 80 and thereby create an incompressible seal. Thus, upon tightening of the assembly mount bolts 19, the tensioning gap 31 may be reduced but not eliminated. Accordingly, the intact tensioning gap 31 enables full plastic deformation of the hard seal 80 until the hard seal 80 closes the outer hard seal portion 82a of the outer clearance gap 82 and the inner hard seal portion 84a of the inner clearance gap 84, as illustrated in FIG. 16. It will be noted that in conventional sealing mechanisms, the hard seal lacks any constraints on the OD of the hard seal. Accordingly, the hard seal (typically copper) would continually grow in OD as its thickness was compressed from the hammering of the combustion cycles, requiring the assembly to constantly be monitored for proper torque of the assembly mount bolts. Without such maintenance, the assembly mount bolts become loose and the hard seal begins to lose its seal and leaks gas or fluids.

In typical application, the pre-chamber assembly 1 is installed in an assembly cavity 52 in a combustion cylinder head 51 of a natural gas engine 50, as illustrated in FIG. 1. The chamber mount flanges 9 of the pre-chamber body 2 may be fastened to the combustion cylinder head 51 using assembly mount bolts 19 (FIG. 1) tightened in the respective bolt openings 18 and/or other suitable attachment technique. A gas ignition spark plug 54 in the combustion cylinder head 51 may interface with the spark plug opening 32 (FIG. 2) in the pre-chamber tip 26. The fuel inlet passage 4 (FIG. 2) is connected to a fuel conduit (not illustrated) which is connected to a fuel source (not illustrated) such as a natural gas source. A cooling jacket 56 (FIG. 1) in the combustion cylinder head 51 may encircle the pre-chamber assembly 1 in the assembly cavity 52. The combustion cylinder head 51 may be fitted with a combustion sensor 53, typically in the conventional manner.

Fuel such as natural gas flows from the fuel conduit (not illustrated) in the combustion cylinder head 51 through the fuel inlet passage 4, the fuel distribution passage 5 and the fuel discharge passage 6, respectively, in the pre-chamber body 2, and into the fuel metering valve 20 through the fuel inlet annulus 22 (FIG. 3) and the fuel inlet passages 23. The fuel metering valve 20 meters the quantity of natural gas which is discharged through the fuel outlet passage 24 into the chamber tip interior 29 of the pre-chamber tip 26. A portion of the natural gas may discharge from the fuel distribution passage 5 through the fuel discharge opening 8 into the chamber tip interior 29. The gas ignition spark plug 54 (FIG. 1) in the combustion cylinder head 51 ignites the natural gas in the chamber tip interior 29 of the pre-chamber tip 26. The ignited gas is emitted from the pre-chamber tip interior taper 30 through the nozzle openings 34. Heat is dissipated from the pre-chamber body 2 and the pre-chamber tip 26 through liquid coolant (not illustrated) in the cooling jacket 56. The elastomeric seal or seals 13 (FIG. 3) and the hard seal 80 prevent leakage of the liquid coolant between the seal covering area 27 of the pre-chamber tip 26 and the flange shoulder 10 in the pre-chamber body 2 and combustion of leaked coolant in the chamber tip interior 29. The pre-chamber tip 26 may be field-replaceable in the pre-chamber assembly 1 according to the knowledge of those skilled in the art.

As illustrated in FIG. 4, in some embodiments of the pre-chamber assembly 1, the pre-chamber tip 26 may include multiple longitudinal cooling fins 38 which protrude longitudinally from the exterior surface of the seal covering area 27 of the pre-chamber tip 26. Accordingly, the longitudinal cooling fins 38 dissipate heat from the seal covering area 27 to the liquid coolant to protect the elastomeric seals 13 (FIG. 3) from heat in operation of the pre-chamber assembly 1. Multiple longitudinal cooling fins 40 may additionally or alternatively protrude longitudinally from an exterior surface of the chamber tip main wall 28. The longitudinal cooling fins 40 may facilitate dissipation of heat from the pre-chamber tip 26 to the liquid coolant.

As illustrated in FIG. 5, in some embodiments, the pre-combustion chamber tip 26a may include a heat-dissipating seal covering sleeve 42 which may include copper or other heat-dissipating material provided in a sleeve cavity 42a in the outer surface of the seal covering area 27. The seal covering sleeve 42 may dissipate heat from the seal covering area 27 to the liquid coolant to protect the O-ring or Elastomeric seals 13 (FIG. 3) from heat in operation of the pre-chamber assembly 1.

As illustrated in FIG. 6, in some embodiments, the pre-combustion chamber tip 26b may include multiple circumferential cooling fins 44 which are provided circumferentially in the seal covering area 27 to facilitate dissipation of heat from the pre-chamber tip 26 to the liquid coolant and protect the elastomeric seals 13 (FIG. 3) from excessive heat in operation of the pre-chamber assembly 1. Multiple circumferential cooling fins 46 may additionally or alternatively be provided circumferentially in the exterior surface of the chamber tip main wall 28 to facilitate dissipation of heat from the pre-chamber tip 26 to the liquid coolant.

Figure 8:
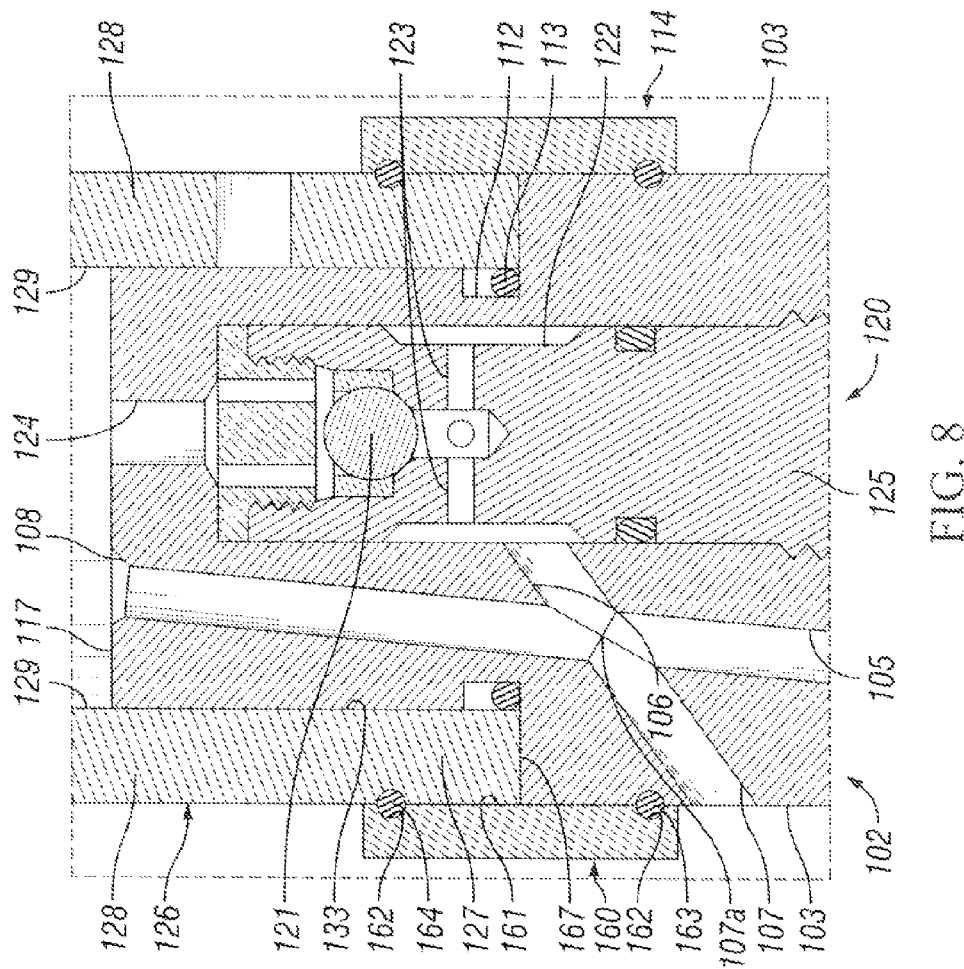
FIG. 8 is an enlarged sectional view, taken along section line 8 in FIG. 7, of the illustrative seal assembly.
Figure 7:
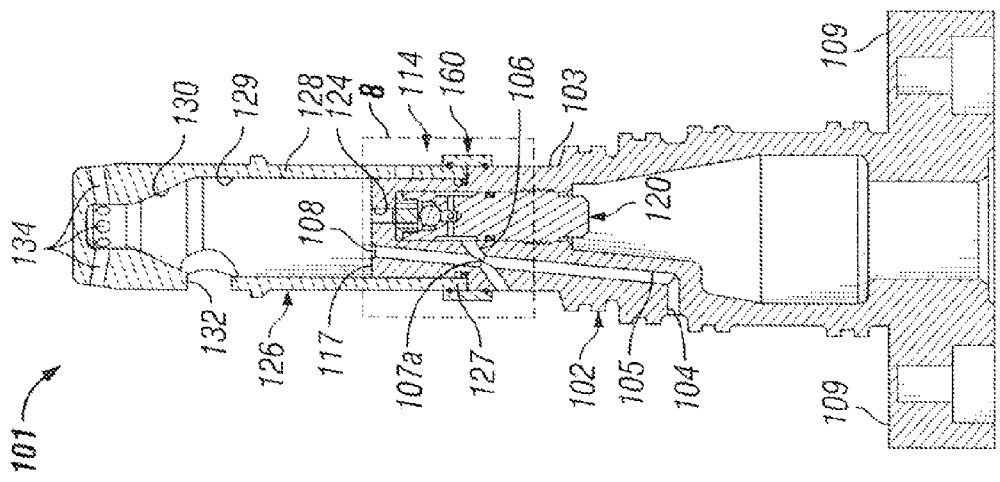
FIG. 7 is a longitudinal sectional view of typical pre-chamber assembly having an alternative illustrative embodiment of the seal assemblies which utilizes an external seal.

Referring next to FIGS. 7 and 8 of the drawings, an alternative illustrative embodiment of the seal assemblies 114 in a pre-chamber assembly 101 is illustrated. In the pre-chamber assembly 101 illustrated in FIGS. 7 and 8, components which are analogous to the respective components of the pre-chamber assembly 1 which was heretofore described with respect to FIGS. 1-6 and 14-16 are indicated by reference numerals in the 101-199 series in FIGS. 7 and 8. The seal assembly 114 may have the same design as that which was heretofore described with respect to the seal assembly 14 in FIGS. 14-16. The seal assembly 114 may additionally include at least one external seal 160 which engages the seal covering area 127 and spans or enshrouds the joint line 167 between the pre-chamber body 102 and the pre-chamber tip 126. In some embodiments, the external seal 160 may include a collar seal which is fabricated of a material having high thermal diffusivity. Non-limiting examples of materials which have high thermal diffusivity and are suitable for the purpose include copper and copper alloys. In other embodiments, the external seal 160 may include at least one elastomeric material applied in a curing solution and/or other similar elastic joint sealing methods or techniques known to those skilled in the art. As illustrated in FIG. 8, the external seal 160 may have an interior seal surface 161. A spaced-apart pair of annular seal grooves 162 may be provided in the interior seal surface 161. A corresponding pair of companion seal grooves (not numbered) which interface with the respective seal grooves 162 may be provided in the outer chamber surface 103 of the pre-chamber body 102 and the exterior surface of the seal covering area 127 of the pre-chamber tip 126, respectively. A proximal elastomeric seal 163 may be provided in the seal groove 162 which is closer to the chamber mount flange 109 end of the pre-chamber body 102. A distal elastomeric seal 164 may be provided in the seal groove 162 which is closer to the chamber tip main wall 128 of the pre-chamber tip 126. Accordingly, the external seal 160 imparts additional heat shielding and liquid sealing capability between the pre-chamber body 102 and the pre-chamber tip 126 at the seal covering area 127.

Figure 9A:
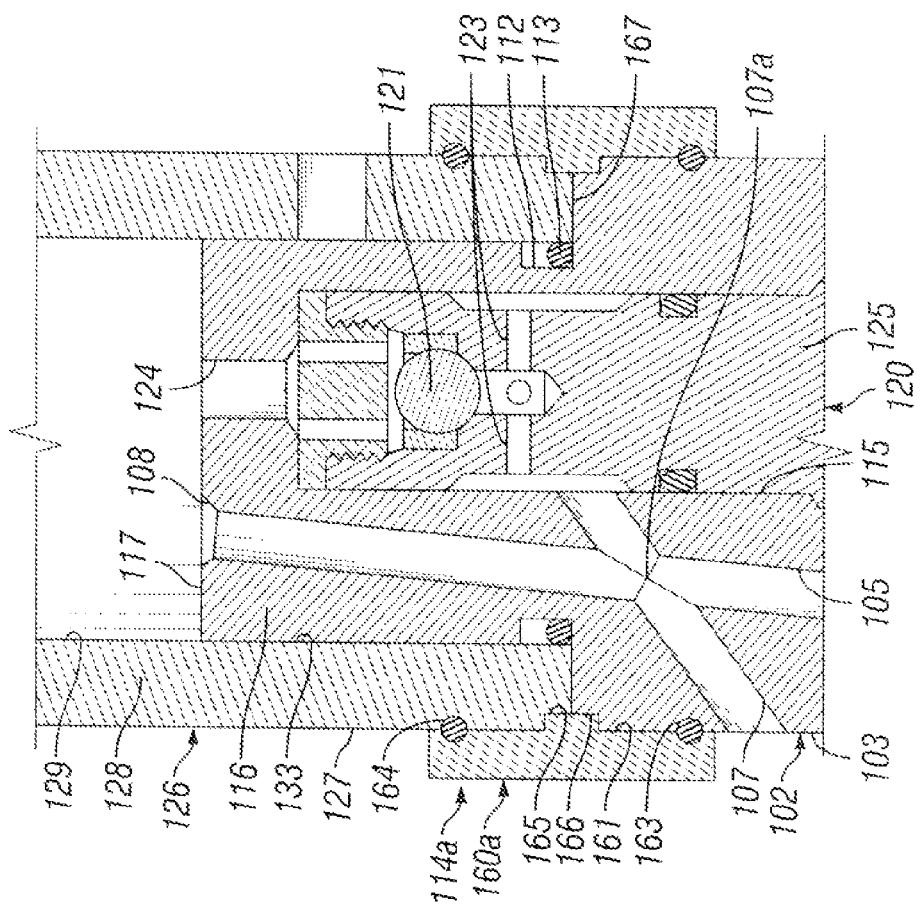
FIG. 9A is an enlarged sectional view of a seal assembly having the external seal illustrated in FIG. 9.
Figure 9:
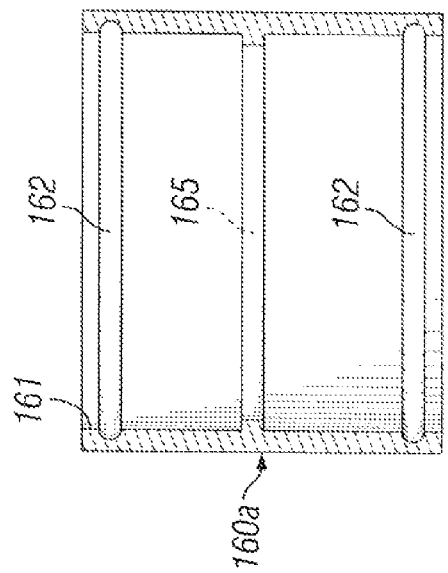
FIG. 9 is a cross-sectional view of an alternative external seal according to an illustrative embodiment of the seal assemblies.

Referring next to FIGS. 9 and 9A of the drawings, an alternative external seal 160a according to an illustrative embodiment of the seal assemblies may include an annular seal flange 165 which protrudes from the interior seal surface 161 between the seal grooves 162. As illustrated in FIG. 9A, an annular seal flange groove 166 may be provided in the exterior surfaces of the pre-chamber body 102 and the pre-chamber tip 126, respectively. The seal flange groove 166 may span the joint line 167 between the pre-chamber body 102 and the pre-chamber tip 126. Accordingly, the seal flange 165 inserts into the companion seal flange groove 166 to form a "hard" seal which imparts a substantially fluid-tight seal between the pre-chamber body 102 and the pre-chamber tip 126 at the hard seal 133.

Referring next to FIGS. 10-13 of the drawings, alternative illustrative configurations for the seal assembly, indicated by reference numerals 14, 214, 314 and 414 in FIGS. 10-13, respectively, are shown. In the pre-chamber assembly 1 illustrated in FIG. 10, the outer diameter of the pre-chamber body 2 may substantially equal the outer diameter of the seal covering area 27 on the pre-chamber tip 26. The shoulder cavity 27a may be disposed inside and adjacent to the seal covering area 27. The combined thicknesses of the seal covering area 27 and the shoulder cavity 27a may substantially equal the thickness of the chamber tip main wall 28.

As illustrated in FIG. 11, in some embodiments of the pre-chamber assembly 201, the thickness of the seal covering area 227 may substantially equal the thickness of the chamber tip main wall 228. Accordingly, the seal assembly 214 may lack the shoulder cavity 27a (FIG. 10).

As illustrated in FIG. 12, in some embodiments of the pre-chamber assembly 301, the outer diameter of the seal covering area 327 may be greater than the outer diameter of the chamber tip main wall 328 of the pre-chamber tip 326. An exterior wall bevel 335 may extend from the exterior surface of the chamber tip main wall 328 to the exterior surface of the seal covering area 327. The thickness of the shoulder cavity 327a may substantially correspond to the thickness of the chamber tip main wall 328.

As illustrated in FIG. 13, in some embodiments of the pre-chamber assembly 401, the shoulder cavity 427a may be disposed outside and adjacent to the seal covering area 427. The outer diameter of the shoulder cavity 427a may substantially equal the outer diameter of the chamber tip main wall 428 on the pre-chamber tip 426. The combined thicknesses of the shoulder cavity 427a and the seal covering area 427 may substantially equal the thickness of the chamber tip main wall 428.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A seal assembly for a pre-chamber assembly, comprising:
 a pre-chamber body having an outer chamber surface;
 a pre-chamber tip;
 a seal covering area carried by the pre-chamber tip;
 at least one hard seal between the seal covering area of the pre-chamber tip and the pre-chamber body;
 at least one elastomeric seal between the seal covering area of the pre-chamber tip and the pre-chamber body;
 a fuel inlet passage in the pre-chamber body;
 a fuel discharge passage disposed in fluid communication with the fuel inlet passage; and
 a drill passage in the pre-chamber body adjacent to the seal covering area and aligned with the fuel discharge passage, the drill passage and the fuel discharge passage disposed at an angle other than 90 degrees with respect to the outer chamber surface of the pre-chamber body.

2. The seal assembly of claim 1 wherein a ratio of outer diameter to inner diameter of the seal covering area is from about 1.03 to about 1.38.

3. The seal assembly of claim 1 further comprising at least one clearance gap between the seal covering area and the pre-chamber body.

4. The seal assembly of claim 3 wherein the at least one clearance gap is less than about 0.020".

5. The seal assembly of claim 3 wherein the at least one clearance gap comprises an outer clearance gap at an outer diameter of the hard seal and an inner clearance gap at an inner diameter of the hard seal.

6. The seal assembly of claim 5 wherein each of the outer clearance gap and the inner clearance gap is less than about 0.005".

7. The seal assembly of claim 1 further comprising at least one external seal spanning a joint line between the seal covering area and the pre-chamber body.

8. The seal assembly of claim 7 wherein the external seal comprises a seal collar.

9. The seal assembly of claim 1 wherein the pre-chamber tip has an outer diameter substantially the same as and continuous with an outer diameter of the seal covering area and the seal covering area overlaps onto the pre-chamber body, providing a substantially smooth and unrestricted surface for coolant flow and thereby enhancing cooling of the pre-chamber body and the pre-chamber tip.

10. A seal assembly for a pre-chamber assembly, comprising:
 a pre-chamber body having an outer chamber surface, a flange shoulder in the outer chamber surface and a chamber nipple extending beyond the flange shoulder;
 a pre-chamber tip having a chamber tip main wall;
 a seal covering area carried by the chamber tip main wall of the pre-chamber tip;
 at least one hard seal between the seal covering area of the pre-chamber tip and the chamber nipple of the pre-chamber body and between the flange shoulder of the pre-chamber body and the chamber tip main wall of the pre-chamber tip;
 at least one elastomeric seal between the seal covering area of the pre-chamber tip and the pre-chamber body;
 at least one clearance gap between the seal covering area of the pre-chamber tip and the pre-chamber body;
 a fuel inlet passage in the pre-chamber body;
 a fuel discharge passage disposed in fluid communication with the fuel inlet passage; and
 a drill passage in the pre-chamber body adjacent to the seal covering area and aligned with the fuel discharge passage, the drill passage and the fuel discharge passage disposed at an angle other than 90 degrees with respect to the outer chamber surface of the pre-chamber body.

11. The seal assembly of claim 10 wherein a ratio of outer diameter to inner diameter of the seal covering area is from about 1.03 to about 1.38.

12. The seal assembly of claim 10 wherein the at least one clearance gap is less than about 0.020".

13. The seal assembly of claim 10 wherein the at least one clearance gap comprises an outer clearance gap at an outer diameter of the hard seal and an inner clearance gap at an inner diameter of the hard seal.

14. The seal assembly of claim 13 wherein each of the outer clearance gap and the inner clearance gap is less than about 0.005".

15. The seal assembly of claim 10 further comprising at least one external seal spanning a joint line between the seal covering area and the pre-chamber body.

16. The seal assembly of claim 15 wherein the external seal comprises a seal collar.

17. The seal assembly of claim 16 further comprising a seal flange groove in the pre-chamber body and the pre-chamber tip and a seal flange protruding from the seal collar into the seal flange groove.

18. The seal assembly of claim 9 wherein the pre-chamber tip has an outer diameter substantially the same as and continuous with an outer diameter of the seal covering area and the seal covering area overlaps onto the pre-chamber body, providing a substantially smooth and unrestricted surface for coolant flow and thereby enhancing cooling of the pre-chamber body and the pre-chamber tip.

19. A seal assembly for a pre-chamber assembly, comprising:
 a pre-chamber body having an outer chamber surface, a flange shoulder in the outer chamber surface and a chamber nipple extending beyond the flange shoulder;
 a pre-chamber tip having a chamber tip main wall;
 a seal covering area carried by the chamber tip main wall of the pre-chamber tip;
 at least one hard seal between the seal covering area of the pre-chamber tip and the chamber nipple of the pre-chamber body and between the flange shoulder of the pre-chamber body and the chamber tip main wall of the pre-chamber tip;
 at least one elastomeric seal between the seal covering area of the pre-chamber tip and the pre-chamber body;
 an outer clearance gap between the seal covering area of the pre-chamber tip and the pre-chamber body and having an outer hard seal portion between the seal covering area and an outer diameter of the at least one hard seal;
 an inner clearance gap between the chamber nipple of the pre-chamber body and the chamber tip main wall of the pre-chamber tip and having an inner hard seal portion between the chamber nipple of the pre-chamber body and an inner diameter of the at least one hard seal;
 a tensioning gap between the pre-chamber body and the pre-chamber tip, the tensioning gap extending from the outer chamber surface of the pre-chamber body to the outer clearance gap;
 a fuel inlet passage in the pre-chamber body;

a fuel discharge passage disposed in fluid communication with the fuel inlet passage; and a drill passage in the pre-chamber body adjacent to the seal covering area and aligned with the fuel discharge passage, the drill passage and the fuel discharge passage disposed at an angle other than 90 degrees with respect to the outer chamber surface of the pre-chamber body; and wherein the pre-chamber tip has an outer diameter substantially the same as and continuous with an outer diameter of the seal covering area and the seal covering area overlaps onto the pre-chamber body, providing a substantially smooth and unrestricted surface for coolant flow and thereby enhancing cooling of the pre-chamber body and the pre-chamber tip.

20. The seal assembly of claim 19 wherein a ratio of outer diameter to inner diameter of the seal covering area is from about 1.03 to about 1.38.

21. The seal assembly of claim 19 wherein the at least one clearance gap is less than about 0.020".

22. The seal assembly of claim 19 wherein the tensioning gap has a width of no greater than about 0.005".

\* \* \* \* \*